United States Patent [19]

Lamothe

[11] 4,043,070
[45] Aug. 23, 1977

[54] ICE FISHING ROD
[75] Inventor: Aimé Lamothe, Cap de la Madeleine, Canada
[73] Assignee: The Raymond Lee Organization, Inc., New York, N.Y.
[21] Appl. No.: 673,747
[22] Filed: Apr. 5, 1976
[51] Int. Cl.² .................................................. A01K 97/10
[52] U.S. Cl. ........................................ 43/21.2; 43/17; 43/18 R; 43/24
[58] Field of Search .................... 43/21.2, 18 R, 20, 24

[56] References Cited
U.S. PATENT DOCUMENTS

| 175,227 | 3/1876 | Winans et al. | 43/20 X |
|---|---|---|---|
| 414,903 | 11/1889 | Godillot | 43/18 R X |
| 608,850 | 8/1898 | Folmer | 43/18 R X |
| 2,729,012 | 1/1956 | Lee | 43/18 R |
| 2,776,516 | 1/1957 | Jennette | 43/24 |

Primary Examiner—Louis G. Mancene
Assistant Examiner—Daniel J. Leach
Attorney, Agent, or Firm—Stephen Wyden

[57] ABSTRACT

An ice fishing rod having a handle and a reel with a means to lock the reel in place when a proper amount of line has been extended therefrom, the line passing through a hollow fishing rod and out through a fishing rod tip. The rod handle is removably attached to a tripod by a support bracket and ice pick tips are attached to distal ends of each of the tripod legs to secure the tripod in the ice near an ice hole.

7 Claims, 8 Drawing Figures

U.S. Patent      Aug. 23, 1977      4,043,070
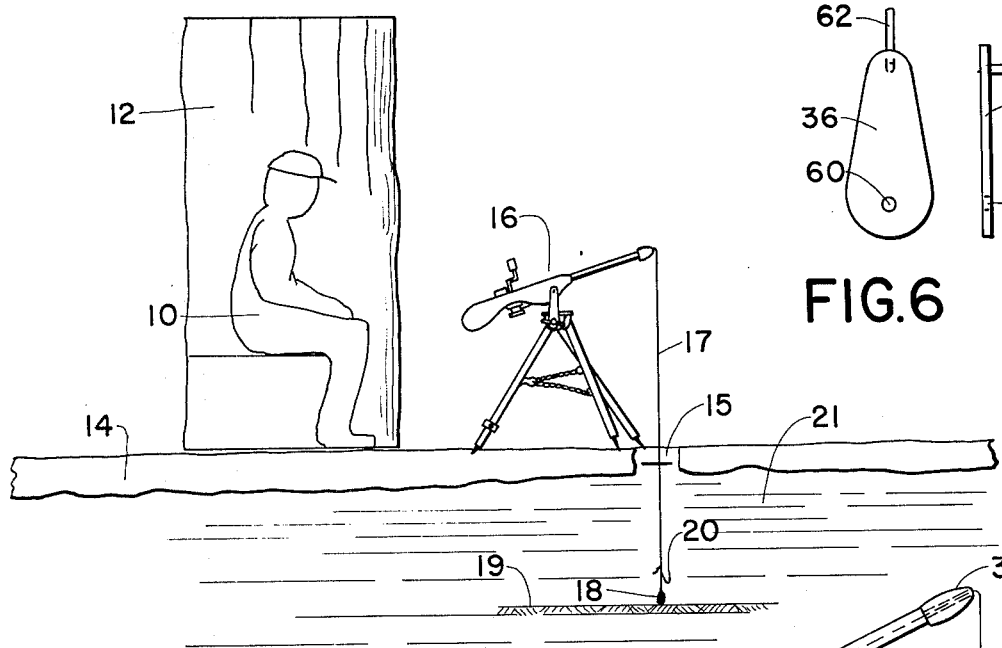
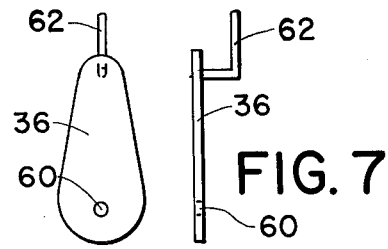
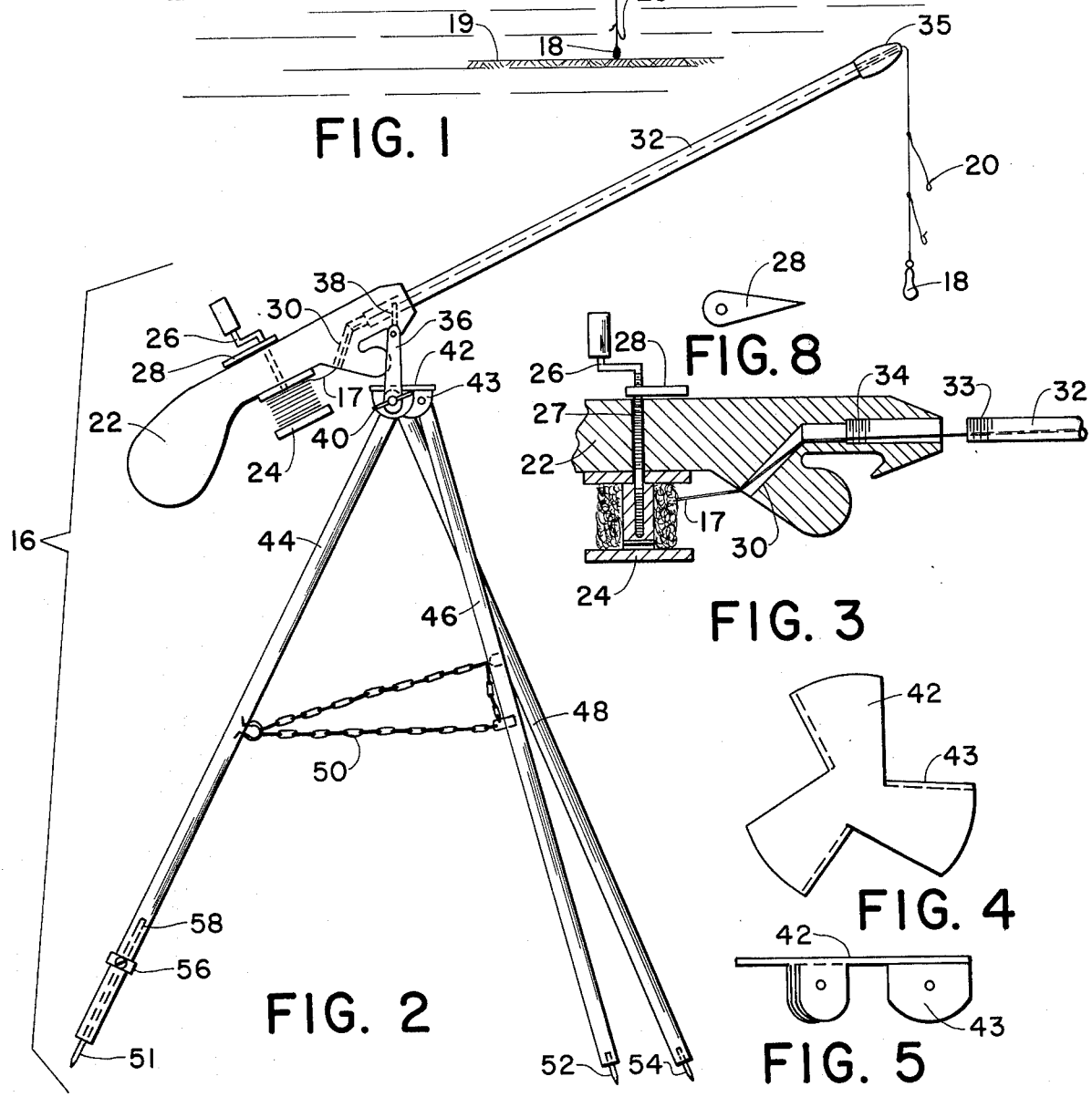
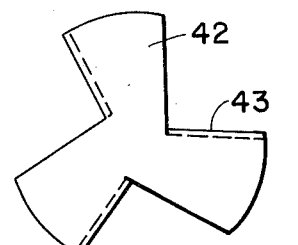
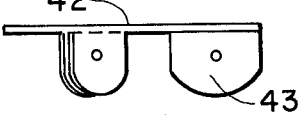

ICE FISHING ROD

My new and novel ice fishing rod will permit a fisherman fishing on the ice to fish a plurality of holes with each rod adjusted to the proper angle permitting each sinker to rest on the bottom and when an activity occurs such as a fish biting a hook on the line or a shift in the tides and currents the bobbing of the fishing rod will notify the fisherman of the activity and the fisherman can act accordingly. With the fishing line locked at the proper length to maintain the fishing rod at the appropriate angle, when a bite occurs the fisherman merely has to grab the rod and pull up the fish. This simple operation is of great value in the rigorous environment under which ice fishing is normally conducted. The fisherman may at that point rebait his hooks, reinsert the line and sinker through the appropriate hole, and the whole set of equipment will be still properly adjusted for that particular hole, and he may then continue fishing with a minimum of interruption due to capture of the fish and repreparation of the equipment.

My invention can be understood in view of the accompanying figures.

FIG. 1 shows the ice fishing rod in use.

FIG. 2 is a close up of the fishing rod device.

FIG. 3 is a longitudinal cross section of a portion of the fishing rod.

FIG. 4 is a top view of the top of the tripod head.

FIG. 5 is a side view of the tripod head.

FIG. 6 is a view of the support bracket for the fishing rod that is attached to the tripod.

FIG. 7 is an edge view of the support bracket of FIG. 6.

FIG. 8 is a top view of a jam nut used in this device.

With regard to FIG. 1, a fisherman 10 is sitting in a ice fishing enclosure 12 resting on the ice 14 while he is watching the hole 15 in the ice 14 and his ice fishing rod 16 which is balanced to hold his fishing lines 17 with his sinker 18 resting on the bottom 19 with his hook 20 floating in the water 21.

With regard to FIGS. 2, 3, 4, and 5, the fishing rod generally referred to by 16 is seen to comprise a handle 22 under which a reel 24 is mounted and is cranked by a crank handle 26. The threaded shaft 27 of the crank handle 26 permits a jam nut 28 to be tightened against the handle 22 when an appropriate portion of lines 17 has been cast off the reel 24. The line 17 enters a shaftway in the handle 22. A hollow fishing rod 32 having a threaded proximal tip 33 and received in a threaded shaftway 34 in the handle 22 carries the line to its distal tip where the line leaves the hollow handle 32 through a fishing rod tip 35. By carrying the fishing line through the hollow rod 32 and having it pass out through a rod tip 35 the dangers of the line freezing or otherwise becoming immobilized during the use of the ice fishing rod are minimized. The sinker 18 and the fishing hooks 20 can be seen attached to the distal end of the fishing line 17. The fishing rod and handle are supported by a support bracket 36 the tip of which is received in a shaftway 38 in the handle 22. The support bracket 36 is attached by a wing nut 40 to the tripod head 42. The angle of the fishing rod can be adjusted by adjusting the angle of the support bracket 36 before tightening the wing nut 40. The tripod head 42 has three faces 43 to each of which one of the tripod legs 44, 46 and 48 is attached. Because the faces 43 of the tripod head 42 are spaced at 120° from each other the tripod legs 44, 46 and 48 will nest comfortably when closed together during transport of the ice fishing rod from fishing area to fishing area. When in the opening position a chain 50 between the tripod legs 44, 46 and 48 keeps the legs from extending too far and helps to support the fishing rod. At the bottom end of each of the tripod legs in an ice pick tip 51, 52 and 54. The ice pick tips help to support the assembly in the ice and will allow the assembly to stand comfortably even if there is no snow to bank around the legs to stabilize the fishing rod. Furthermore, one of the legs 44 has a set screw 56 for pressing against the ice pick tip 52 which is adjustable within a shaftway 58 in the tripod leg 44, so that the tripod leg assembly can be levelled independent of the smoothness of the ice terrain on which the fishing is being conducted.

With regard to FIGS. 6 and 7, the rod support bracket 36 is seen to have a hole 60 through which the wing nut 40 may secure the bracket 36 to the tripod head face 43 and a bracket ferrule 62 extends upwardly and offset from the body of the support bracket 36 in order to engage the shaftway 38 in the handle 22. The removeable insertion of the ferrule 62 within the shaftway 38 permits the rapid capture of a fish caught on a hook and permits the reassembly of the ice fishing rod to catch another fish without the need to readjust the rod, the handle, the tripod, or the line.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:
1. An ice fishing rod, comprising:
   a handle,
   a fishing reel crank attached through the handle,
   a fishing reel attached to a distal end of the fishing reel crank,
   means of locking the fishing reel in a specific position attached to the crank handle near a proximal end of the crank handle,
   a hollow rod attached to the handle,
   means of conveying a line attached to the reel through the handle and through the hollow rod and retractably extensible through a distal tip of the hollow rod,
   a tripod, and
   means of attaching the handle and rod to the tripod.
2. The ice fishing rod of claim 1, wherein the means of locking the crank handle and reel to the handle comprises a jam nut.
3. The ice fishing rod of claim 1, wherein the means of attaching the handle and rod to the tripod comprises:
   a shaftway formed in a distal end of the handle, a support bracket,
   an offset male ferrule upwardly extending from and attached to an upper end of the support bracket and removeably receiveable within the shaftway, and
   a tightening means of securing a lower end of the support bracket to a head of the tripod.
4. The ice fishing rod of claim 1, further comprising:
   a threaded shaftway formed in a distal end of the handle and communicating with a second shaftway extending through the handle to form an opening adjacent to the reel,
   the hollow rod threadingly receivable in the threaded shaftway, and a rod tip attached to a distal end of the hollow rod, whereby the fishing line may be kept protected from the environment between the reel and the free end which may be dropped into a fishing hole.

5. The ice fishing rod of claim 1, wherein the tripod comprises:
   a tripod head forming three faces at 120° from each other,
   a tripod leg pivotally attached to each face,
   means of constraining the legs from extending beyond a prescribed angle, and
   an ice pick tip attached to a distal end of each tripod leg.

6. The ice fishing rod of claim 5, wherein the means of constraining the legs is a chain.

7. The ice fishing rod of claim 5, further comprising:
   a shaftway formed in a distal end of one of the tripod legs,
   the ice pick tip removeably insertable in the shaftway, and
   a set screw passing through a distal portion of the tripod leg and secureably engaging the ice pick tip within the shaftway.

* * * * *